Dec. 7, 1965 N. J. ALBANES ETAL 3,222,460

MULTIPLE STATION SELECTION SYSTEM

Filed Aug. 10, 1962 4 Sheets-Sheet 1

*INVENTORS*
NICHOLAS J. ALBANES
MATTHEW P. LANGENDORF
BY D. Kendall Cooper
ATTORNEY.

MULTIPLE STATION SELECTION SYSTEM

Filed Aug. 10, 1962

MULTIPLE STATION SELECTION SYSTEM

Filed Aug. 10, 1962 4 Sheets-Sheet 3

3,222,460

MULTIPLE STATION SELECTION SYSTEM

Nicholas J. Albanes, Bethesda, Md., and Matthew P. Langendorf, Lexington, Ky., assignors to International Business Machines Corporation, New York, N.Y., a corporation of New York Filed Aug. 10, 1962, Ser. No. 216,261
8 Claims. (Cl. 179—100.1)

Figure 1:
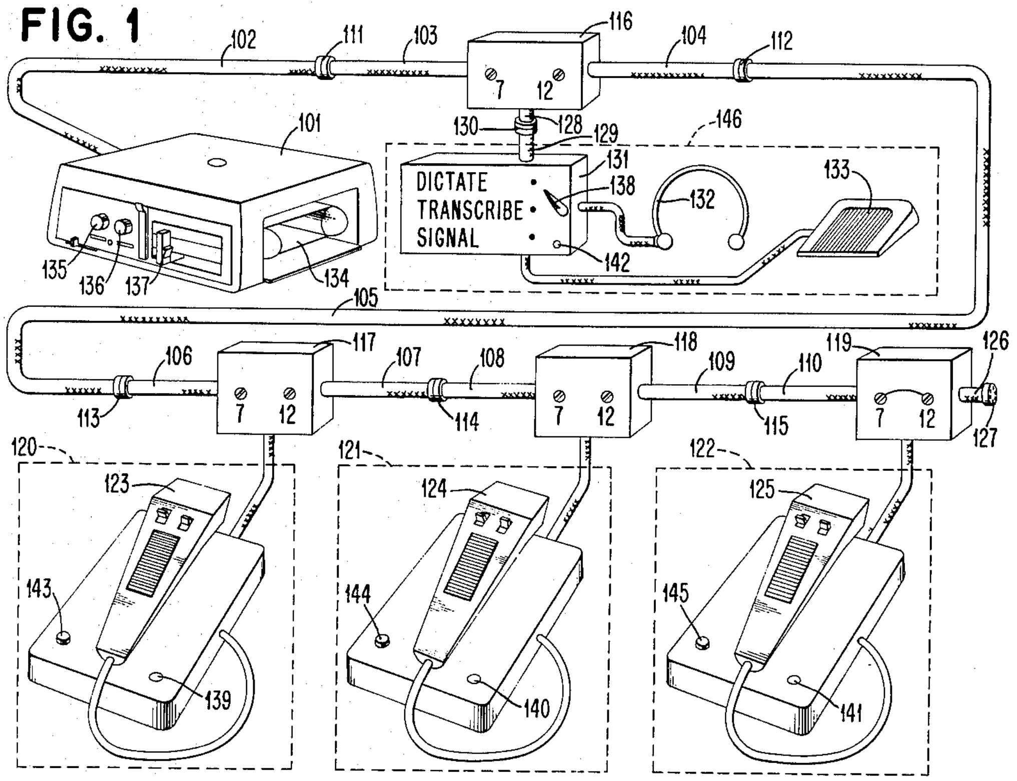

This invention relates to multiple station systems, and more particularly, to a system of this type which has a plurality of diversely located dictating or control stations coupled to a central recording station, and which also has a transcribing station as an optional feature.

When a system of this type is provided, it is necessary that only one of the dictating stations or the transcribing station be able to gain access to the central recording station at any time.

A number of selection arrangements have been proposed in the prior art for establishing access to the central recording station by the various stations. These selection arrangements have generally been characterized by an undue amount of complexity, or have required a considerable amount of hardware for their proper functioning.

Prior art systems have operated satisfactorily under normally encountered conditions where, for example, demand for use of the central recording facilities by the stations in the system has occurred in a sequential or successive manner. Prior art systems have not proven to be entirely suitable however, when unusual situations arise such as, for example, where two remote dictating stations seek access to the central recording facilities concurrently.

Under these circumstances, a racing condition has usually resulted with side effects such as back circuits, so that system connections are improperly established, or so that, in an extreme case, the system breaks down completely.

Accordingly, an object of the invention is to provide a multiple station system which has simplified selecting and connecting circuits.

Another object of the invention is to provide a system having a plurality of diversely located stations, wherein selection facilities are furnished at each station which are interrelated and interdependent upon selection facilities at all other stations.

Still another object of the invention is to provide a system wherein selection and connection of remote stations simultaneously seeking access to a central facility is determined according to a predetermined order of priority.

Also, an object of the invention is to provide a system wherein individual control stations are selectively connected to a central station according to a predetermined order of priority, and wherein additional control stations can be easily connected to the system without disturbing the basic order of priority.

An additional object of the invention is to provide a dictating system wherein a plurality of remote stations including an auxiliary transcribing station are selectively connected to a central dictating station according to predetermined priority arrangements.

In order to accomplish these and other objects of the invention a system has been provided which has a central recording station that is interconnected with a number of diversely located control stations, and which includes selection circuitry responsive to initiation of a service request by any control station for preventing subsequent selection of any other control station and for establishing connection between said control station and the central station except when another control station having a higher priority in the system has also concurrently requested service, whereupon said latter control station will be connected to said central station.

The foregoing and other objects, features and advantages of the invention will be apparent from the following more particular description of the preferred embodiment of the invention as illustrated in the accompanying drawings.

In the drawings:

FIGURE 1 represents a generalized diagram of the preferred embodiment of the invention.

Figures 2A, 2B:
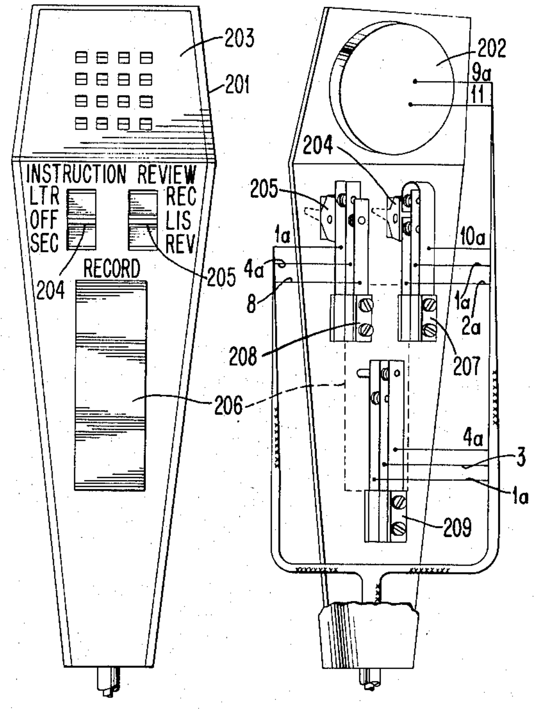

FIGURES 2*a* and 2*b* together show a microphone with control switches, that is supplied at each remote dictating station.

Figure 3:
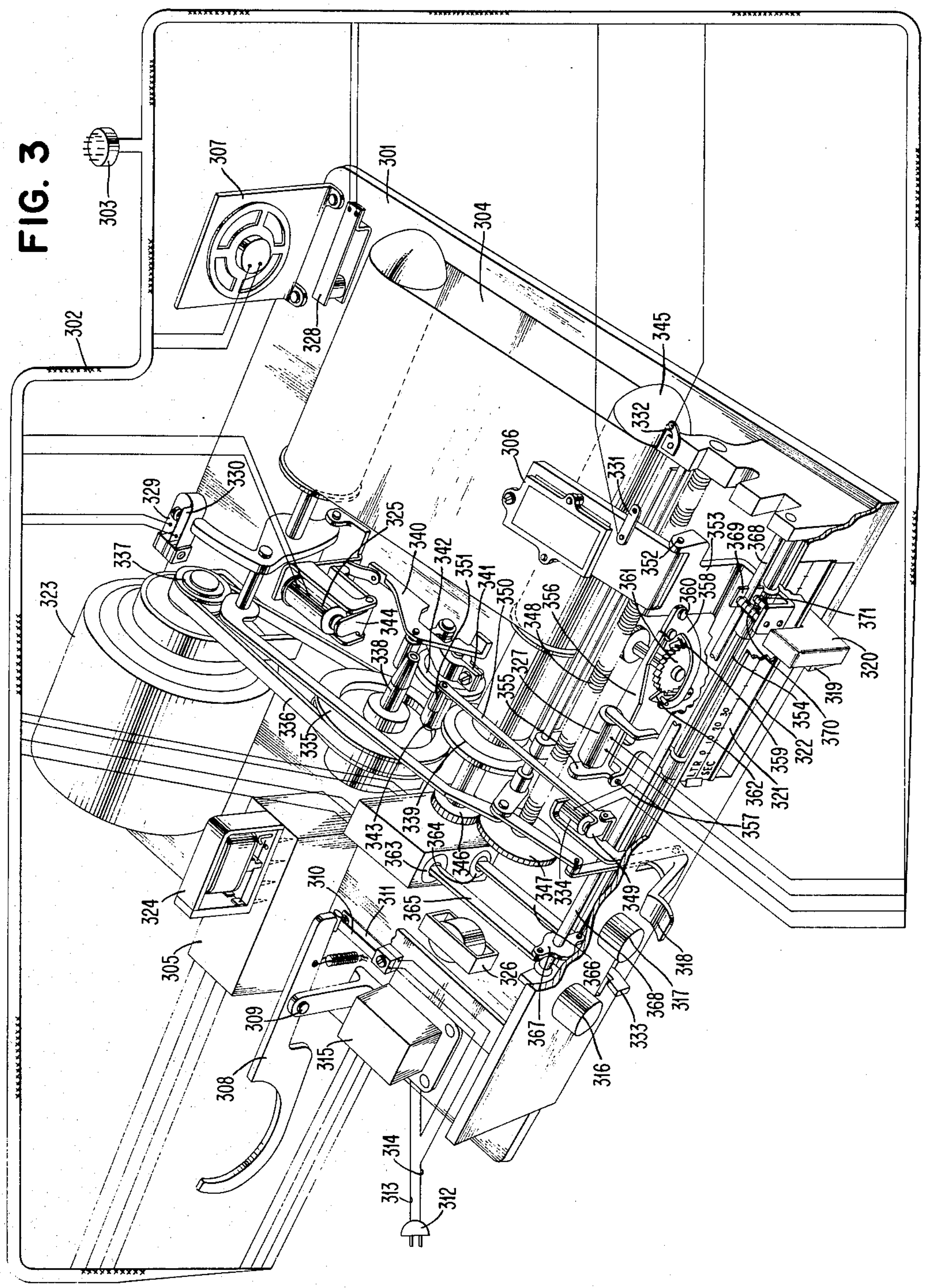

FIGURE 3 is a diagrammatic representation of a central recording apparatus, which also has transcribing facilities.

Figure 4:
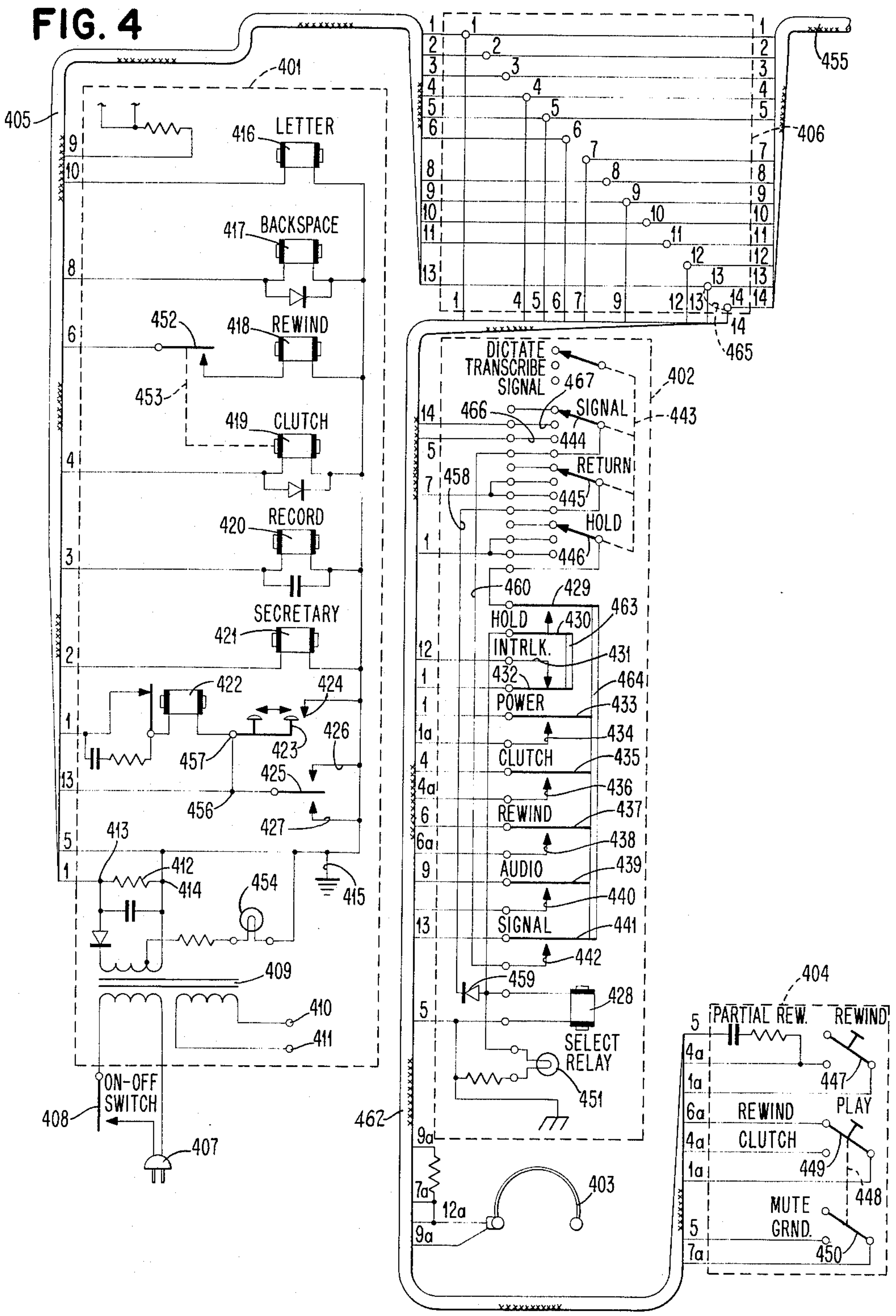
Figure 5:
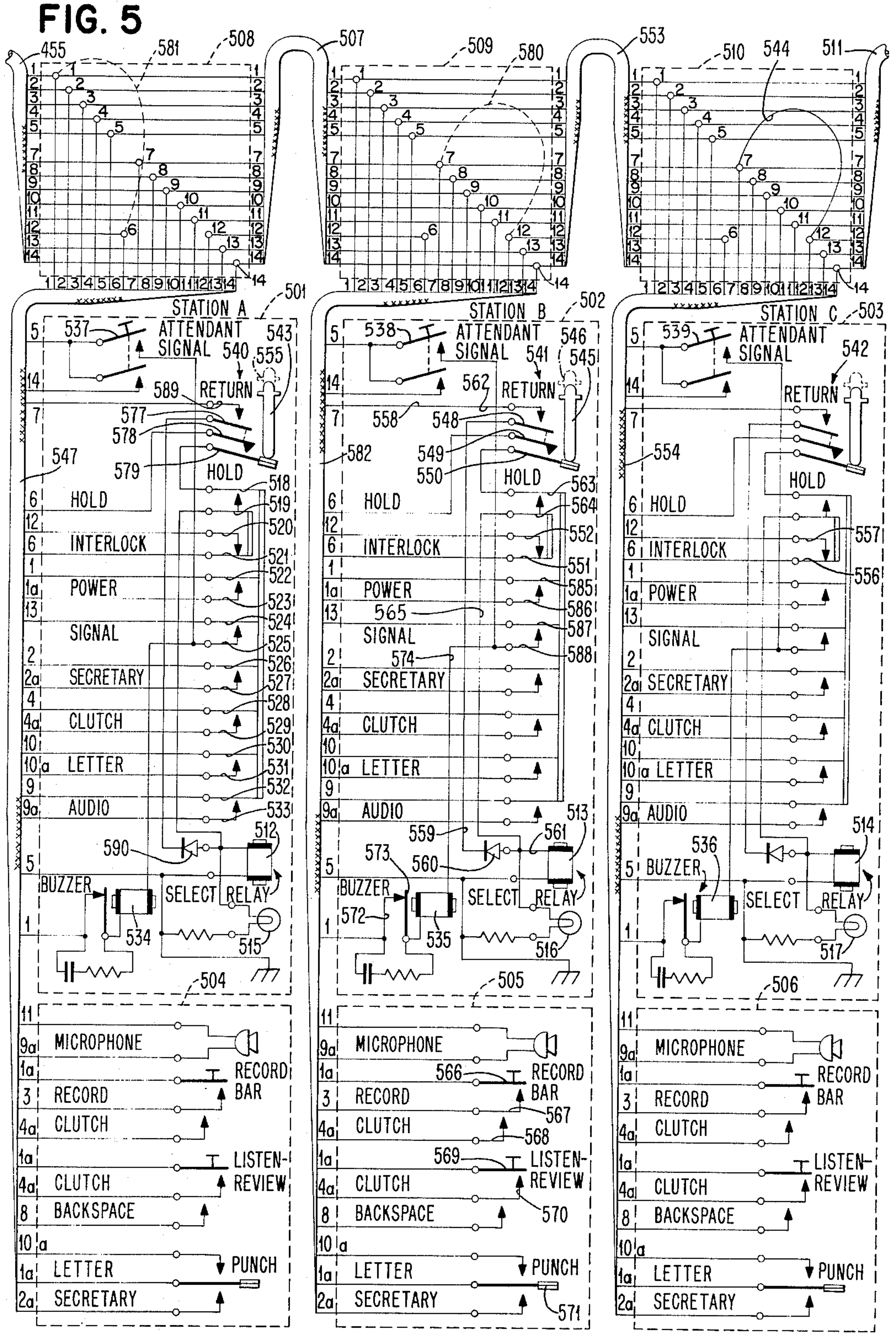

FIGURES 4 and 5, together, represent a complete circuit diagram of a preferred embodiment of the invention.

*General description*

In FIGURE 1, a centrally located dictating and transcribing apparatus 101 is connected by cables 102–110, connectors 111–115, and junction boxes 116–119 to three remote dictating stations 120, 121, and 122, which have respectively associated microphones 123, 124, and 125. Additional dictating stations can be conveniently added to the system by attachment to cable 126 and connector 127.

The central dictating and transcribing apparatus 101 is also connected through junction box 116, cables 128 and 129, and connector 130, to a transcribe station 146 which includes a control box 131, earphones 132, and a transcription foot pedal 133. The apparatus 101, which is described in greater detail below, has a magnetic belt 134 on which dictated material received from any station 120, 121, and 122, is recorded. The apparatus 101 has a number of controls such as a volume control 135, a tuning control 136 which insures proper tracking during transcription, and an index position selector 137 for effecting rapid movement to any desired track area on the belt 134.

The selection and connecting circuitry of the system is routed from the apparatus 101, through the transcribe station 146 and each of the stations 120, 121, and 122.

During dictating operations, a switch 138 on the transcribe control box 131 is set to an upper one of three positions, which is labelled "Dictate." With the switch 138 in this position, any one of the remote stations 120, 121, and 122 can obtain access to the central apparatus 101 for dictation purposes, if another remote station does not currently have access. The microphones 123, 124, and 125 normally rest on cradle switches at their associated stations which maintain the stations in a disconnected condition. Connection of any remote station is selectively established under proper conditions in a simplified and automatic manner by simply removing a microphone from its cradle.

A person desiring to dictate from remote station 121, for example, initiates a selection sequence for connection of station 121 to the central apparatus 101 by removing microphone 124 from its cradle. If the central apparatus 101 is not currently in use, the remote station 121 will be automatically and immediately connected to it for dictation purposes. If on the other hand, one of the other remote stations 120 or 122 is connected to the central apparatus 101, an open circuit will exist at the station 121 so that no connection to the central apparatus 101 can be effected. The system of FIGURE 1 includes selection and connecting arrangements which are automatically operative to establish a valid connection between the central apparatus 101 and a remote station 120, 121, or 122 according to a predetermined priority scheme, in the event that two or more stations request service simultaneously. The priority arrangement results in the station closest to the central apparatus 101, such as station 120, being connected in preference to a station that is more remote from the central apparatus 101, such as station 121.

Each dictating station has an indicator respectively associated therewith, such as indicator lamps 139, 140, and 141, which serves to indicate that the station has been connected properly to the central apparatus 101 for dictating purposes.

The transcribe control box 131 also has an indicator 142 which indicates that the transcribe station 146 has been properly connected to the central apparatus 101 for transcribing purposes. A transcription operation is initiated by the transcriber moving the switch 138 to the "Transcribe" position. If none of the remote stations 120, 121, or 122 is currently connected for dictating purposes to the central apparatus 101 when the switch 138 is moved to the "Transcribe" position, the transcriber will gain immediate access to the apparatus 101, and the normal selection and connection functions with respect to the remote stations 120, 121, and 122 will be rendered ineffective.

If on the other hand, one of the remote stations 120, 121, and 122 is in the process of using the central apparatus 101 when the switch 138 is moved to the "Transcribe" position, the transcriber will not gain control of the apparatus 101 until the remote station involved has completed its dirtation and has become deselected. As soon as the remote station has completed dictation, the transcribe station will automatically be connected to the apparatus 101 if the switch 138 is left in the "Transcribe" position.

Each of the remote stations 120, 121, and 122, as well as the central apparatus 101, has a buzzer for signaling purposes. If switch 138 is moved to the "Signal" position, the buzzer in the central apparatus will be energized to give the transcriber an audible indication that the remote station has completed dictation.

If the transcribe station 146 has been connected to the apparatus 101, and the switch 138 is in the "Transcribe" position, a remote station which requires service, can so indicate by depressing the associated "Attendant" button 143, 144, or 145. The buzzer at the apparatus 101, will then be actuated to inform the transcriber that dictation service is required. The buzzer at the remote station will also be actuated. The appropriate connections between the station requiring service and the central apparatus 101 are established subsequently when the transcriber again moves the switch 138 to the "Dictate" position.

*Remote station controls*

Each of the microphones 123, 124, and 125 is similar to that shown in FIGURES 2*a* and 2*b*. FIGURE 2*a* is a front view of the microphone, while FIGURE 2*b* is a rear view of the microphone. Various control elements are enclosed within a case 201. A transducer element 202 is positioned behind a grill generally indicated at 203. The microphone is provided with a three position Instruction or Indexing switch 204, a three position Review switch 205, and a Stop-Start or Record bar 206. The switches 204 and 205, as well as the bar 206, actuate respectively associated contact assemblies 207, 208, and 209. The Instruction switch 204 has three functional positions which are Letter (Ltr.), Off, and Secretary (Sec). The review switch 205 has three functional positions which are Record (Rec), Listen (Lis), and Review (Rev). Movement of the various switches to their alternate positions with appropriate closing or opening of their associated contact assemblies result in corresponding functions being performed at the central apparatus 101 when a station has been connected to the apparatus 101.

An operator at a remote station who has lifted the microphone from the station cradle can initiate a dictating operation, for example, by moving the switch 205 upward to the Record (Rec) position. This prepares the central apparatus 101 for a recording operation. The actual recording then takes place when the operator depresses the Record bar 206. If the operator desires to hear what he has previously recorded, he moves the switch 205 to the Review (Rev) position, which results in the magnetic belt at the central apparatus 101 being backspaced. The switch 205 is spring loaded in the lower Review (Rev) position so that it will return to the central Listen (Lis) position and the operator can then listen to the previously backspaced belt. The central apparatus 101 has an index sheet or tab which can be selectively perforated as dictation proceeds in order to inform the transcriber subsequently that the end of a letter has been reached or that certain material should be inserted at a particular spot during playback of the belt. The perforation of the index tab at the apparatus 101 is under control of the switch 204 which is moved to the upper Letter (Ltr) position to actuate an End of Letter punch, or which is moved to the lower Secretary (Sec) position to actuate the special instruction punch.

*Recording-transcribing apparatus*

The central recording-transcribing apparatus 101 of FIGURE 1 is shown in greater detail in FIGURE 3. The apparatus has various components mounted on a base 301 with circuit connections being completed through a cable 302, which corresponds to cable 102 in FIGURE 1. The apparatus is attached to the central station junction box through a connector 303, which corresponds to a portion of the connector 111 in FIGURE 1. FIGURE 3 is diagrammatic in nature, and will be understood that the various components and circuit connections are positioned in FIGURE 3 primarily for purposes of clarity and do not necessarily represent optimum arrangements that would be found in a production machine.

While other types of recording apparatus using media such as cylinders, discs or tapes could readily be used in practicing the invention, the apparatus in FIGURE 3 uses a magnetic belt 304. The apparatus in FIGURE 3 can be used for both dictation and transcription and the mode of operation is determined by the selection of appropriately controlled circuits in the unit. The unit includes a record relay 324 and an amplifier which is contained in a housing 305.

Information to be recorded is applied from a microphone to the amplifier 305 and to the magnetic belt 304 through a combination recording-reading head 306. Previously recorded signals on the belt 304 can be picked up by the head 306 for review purposes during dictation, or for transcription purposes. The signals picked up by the head 306 are amplified by the amplifier 305 and applied either to a microphone such as that shown in FIGURES 2*a* and 2*b*, or a speaker such as speaker 307 in FIGURE 3, during dictation. The amplified signals are applied to earphones such as earphones 132, in FIGURE 1, during a transcription operation. The central recording-transcribing apparatus may or may not have a local microphone. If a microphone is supplied, it would normally rest in a cradle 308. The cradle 308 is pivoted at pivot point 309 for actuating a set of contacts 310 and 311. The apparatus in FIGURE 3 is powered from a suitable source through a plug 312 and line wires 313 and 314. If a microphone is supplied at the central station, contacts 310 and 311 are inserted in series with the line 314 to turn the equipment on or off. If no microphone is supplied, the contacts could be replaced by a suitable on-off switch, not shown. The line voltage is applied to a transformer-rectifier element 315 which then supplies suitable operating voltages to the rest of the system. The line voltage is also applied to a motor 323, which drives various mechanisms, to be described.

The apparatus in FIGURE 3 has a number of locally situated controls, other than the microphone hanger 308, just mentioned. Some of the controls and their functions are indicated below:

A volume control 316 permits regulation of volume during playback.

A tuning control 317 permits accurate tracking adjustment of the sound head 306 with respect to the belt 304 when the belt has been removed and is reinserted, or a different belt inserted.

A belt release lever 318 is moved forward to permit removal or insertion of the belt 304.

The sound head 306 can be positioned to any point on the belt 304 by squeezing an element 319 on an index control lever 320 and sliding the lever 320 to the left or right as desired.

An index slip or tab 321 is inserted in a holder 322 for selective perforation by the person dictating which provides certain instructions to the person who transcribes. The slip 321 has a number of indices 0, 10, etc, through 140, for indicating the relative position of the head 306 with respect to the belt 304.

Whenever the dictate bar on any of the microphones, such as microphones 123, 124, and 125 in FIGURE 1, is depressed, circuits are completed to the record relay 324 and a clutch magnet 325. The drive mechanism is then actuated and the belt 304 is placed in motion. The energization of the record relay 324 switches the signal from any of the microphones at an activated remote station through the amplifier 305 to an output transformer 326. The amplified signal is coupled to a record winding of the sound head 306, and with the record relay 324 picked, an oscillator circuit not shown, is also activated. The output of the oscillator circuit is applied to an erase winding of the sound head 306 and provides an erase signal. A portion of this voltage is also applied across the record gap to furnish a bias voltage. As the belt 304 moves past the erase and record gaps of the sound head 306, the previously recorded information is erased and the new information is recorded.

If it is desired to play back any of the previously recorded information, the Review switch on the microphone is moved to the Review position, at which time a backspace magnet 327 and the clutch magnet 325 are energized. As a result of this, the sound head 306 is moved backward one recorded track and the drive mechanism is engaged. As the belt 304 moves past the gap in the sound head 306, flux density variations in the belt 304 cause signals to be induced in the head 306 read winding. The signal is amplified and applied to the output transformer 326. The signal is then applied to the speaker 307 or a microphone, not shown, in the event of a local dictating operation, or to one of the microphones 123, 124, or 125.

A buzzer 328 is provided at the central station in order to indicate certain conditions of the apparatus. With the belt release lever 318 in the forward or released position, contacts 329 and 330 are closed and the buzzer 328 is energized to indicate that no belt is in position.

It is also necessary to have an indication that the sound head 306 has approached the end of the belt 304. This is accomplished by means of a contact 331 and a contact 332 which close as the sound head reaches the right extremity of its travel. This also results in the buzzer 328 being energized.

A speed control lever 333 is provided and enables a transcriber to adjust the transcription speed by moving the lever to the right or to the left, so that a comfortable transcription speed can be established.

The foot control 133, FIGURE 1, is a rocker type treadle. The right side of the pedal initiates a transcription operation. The left side of the pedal starts a reverse operation. The reverse operation enables the operator to reverse the direction of the belt 304 rotation and move the sound head 306 to the left.

When the operator depresses the transcription side of the foot control, the clutch magnet 325 is energized and the clutch is engaged. Motion is now transmitted from the motor 323 through the drive mechanism to the belt 304 and to the sound head 306.

When the operator removes her foot from the pedal, the clutch is held energized by discharging capacitors. A circuit is also completed to the reverse magnet 334. Energization of the reverse magnet 334 results in the direction of belt rotation being reversed, as will be described shortly.

The motor 323 drives a fly wheel 335 by means of a drive belt 336 that is engaged with a fly wheel 335 and a motor pulley 337. The fly wheel 335 has a tapered spindle 338 which permits the variable speed drive under control of the lever 333, previously mentioned. A drive wheel 339 is activated in the following manner. Associated with the clutch magnet 325 is a swivel bracket 340. Pivotally mounted to the swivel bracket 340 is a rocker arm 341 and a rotatable idler wheel 342. The idler wheel 342 has a tapered shaft 343. When the clutch magnet 325 is energized, its armature 344 is attracted and causes the idler wheel 342 to engage the tapered spindle 338 and the drive wheel 339, thereby causing rotation of drive wheel 339. The drive wheel 339 is attached through a shaft to a drive roller 345, on which the belt 304 is mounted. Rotation of the drive roller 345 drives the belt 304.

In addition, to the drive roller 345, the drive wheel 339 causes the rotation of gears 346 and 347. Gear 347 is fixedly attached to a lead screw 348 which is a worm gear. The sound head 306 is coupled to the lead screw 348, and as the lead screw revolves, the sound head 306 is moved from left to right, or vice versa, across the belt 304.

In order to effect reverse rotation of the drive roller 345 and the lead screw 348, a magnet 334 is energized. Energization of magnet 334 results in the attraction of its armature 349 and the consequent clockwise or downward rotation of a reverse arm 350. Rotatably attached to reverse arm 350 is a roller 351. As the reverse arm 350 is rotated, the roller 351 is forcibly inserted between the idler wheel 342 and the drive wheel 339 which effects a reverse rotation of the roller 345 and lead screw 348.

The sound head 306 is pivotally mounted at 352 to a carriage 353 which is slidably mounted on a shaft 354. Also affixed to the carriage 353 is the backspace magnet 327, and associated mechanism. It will be recalled that a backspace operation is initiated each time the review switch on the microphone is placed in the review position. This completes a circuit to the backspace magnet 327. As the backspace magnet is energized, its armature 355 and extension 356 are rotated about a pivot point 357. As the armature extension 356 rotates, it forces a lock pawl arm 358 and associated feed pawl 359 to swing as an assembly about a pivot point 360. Movement of the feed pawl 359 forces a ratchet 361 to rotate in a clockwise direction one space. A lock pawl 362 is cammed away from the ratchet 361 and falls into the next tooth of the ratchet, thereby rotating lead screw 348 and moving sound head 306 backward (right to left) one recorded track.

In order to effect perforation of the index slip 321, a "Secretary" solenoid 363 and a "Letter" solenoid 364 are supplied. These solenoids actuate arms 365 and 366 which are attached to a plate 367 that is mounted on a shaft 368. Attached to the shaft 368 is an actuator 369 which is positioned adjacent the ends of a pair of punches 370 and 371. Energization of the "Secretary" solenoid 363 results in rotation of the shaft 368 so that the actuator 369 contacts punch 371 to cause a "Secretary" punch in the slip 321. Energization of the solenoid 364 results in rotation of the shaft 368 so that the actuator 369 contacts the punch 370 to cause a "Letter" punch in the slip 321.

*System operation*

Operation of the system will be described by reference to FIGURES 4 and 5 which together form a circuit diagram of the system. FIGURES 4 and 5 should be arranged side by side with FIGURE 4 on the left. FIGURE 4 depicts portions of the central apparatus 101 circuitry and the transcribe station 146 circuitry of FIGURE 1, while FIGURE 5 shows the circuitry at each of the three remote stations 120, 121, and 122 that were shown in FIGURE 1. These stations are respectively designated A, B, and C in FIGURE 5. The central apparatus circuitry is enclosed within the dashed outline 401, FIGURE 4. The transcribe station 146 circuitry is enclosed within the dashed outlined 402, FIGURE 4. Attached to the transcribe station 402 is an earphone 403 which corresponds to earphone 132, FIGURE 1. Also, attached to the transcribe station 402, is a foot control 404, which corresponds to the foot control 133, FIGURE 1.

The selecting and connecting circuitry of the stations A, B, and C is shown in three dashed outline control boxes 501, 502, and 503 respectively, FIGURE 5. Microphone circuits 504, 505, and 506 correspond respectively to the microphone 123, 124 and 125, FIGURE 1.

The various stations and components in the system are interconnected by means of cabling that is generally indicated at 405, 462 and 455 in FIGURE 4 and 507, 547, 553, 582, 554, and 511 in FIGURE 5. The cabling comprises up to 14 independent wires. The individual cable wires are basically numbered 1 through 14 throughout the system, and some of them are further designated by a suffix, such as 1*a*, 2*a*, etc. Corresponding terminals are likewise generally numbered 1 through 14. The various cables in the system are interconnected through junction boxes 406, 508, 509, and 510. Additional remote stations could be readily be attached by means of cable 511 which extends from junction box 510.

Referring to FIGURE 4, the central apparatus 401 is plugged in to a suitable power source by means of a plug 407. Closing of an On-Off switch 408 results in the application of line power to a transformer 409. The amplifier at the central apparatus, not shown, is supplied power from terminals 410 and 411. Another transformer output is suitably rectified and supplied across a resistor 412 and terminals 413 and 414 to the rest of the system. It will be noted that the terminal 414 is the ground side of the system as indicated at 415. Various operating potentials may be used in the system but in a typical case, the output at terminal 413 would be around —35 volts D.C. with no load. The central apparatus 401 is provided with various elements which are readily recognizable from previous discussion.

These include:

Letter Punch Solenoid 416
Backspace Magnet 417
Rewind Magnet 418
Clutch Magnet 419
Record Relay 420
Secretary Punch Solenoid 421
Buzzer 422
End of Belt Contacts 423 and 424
No Belt Contacts 425, 426, and 427

Referring now to the transcribe station 402, it will be noted that this station is provided with a select relay 428. Energization of the relay 428 results in actuation of various contacts 429–442 by movement of contact operating bars 463 and 464. These contacts serve to connect the transcribe station into operating relationship with the central apparatus 401 under proper conditions. The contacts 429–442 are arranged in sets that are respectively labelled, "Hold, Interlock, Power, Clutch, Rewind, Audio, and Signal." A three position mode control switch 443 is supplied which corresponds to the switch 138 in FIGURE 1, and which has a Dictate, a Transcribe, and a Signal position. The switch comprises three switching subassemblies, 444, 445, and 446, which are respectively labelled Signal, Return and Hold.

Also of interest in connection with the transcribe station 402 are the switches that are included in the foot control 404. These switches include a Rewind switch 447 and a Play switch 448 which comprises two switching subassemblies 449 and 450.

Shunted across the select relay 428 is a lamp 451 which is energized whenever the select relay 428 is energized and which indicates to the transcribe operator that the transcribe equipment has been connected to the central apparatus 401.

Referring now to FIGURE 5, it will be noted that the selecting and connecting circuits 501, 502, and 503 at the remote stations A, B, and C have select relays 512, 513 and 514 which are respectively associated therewith, and which perform selection functions like the relay 428 that is associated with transcribe station 402. Relays 512, 513, and 514 therefore serve to connect their associated stations to the central apparatus 401. Each of the select relays 512, 513, and 514 has a respectively associated lamp 515, 516, and 517 for indicating when its station has been connected to the central apparatus 401 for dictating purposes.

The select relays 512, 513, and 514 control switching contacts that are similar to those controlled by the select relay 428, with the exception that they control different functions in the system and are therefore labelled differently, in some cases. This may be observed by noting the contacts 518–533 that are associated with relay 512, station A. These contacts are arranged in sets that are respectively labelled "Hold, Interlock, Power, Signal, Secretary, Clutch, Letter, and Audio." The contacts associated with the select relays in the other dictating stations B and C are similarly labelled.

Each station A, B, and C also has a respectively associated buzzer 534, 535, and 536 which is used to notify the operator of various conditions in the system. Each station also has a double contact attendant switch. These are designated 537, 538, and 539.

In addition, each remote station A, B, and C, has a cradle switch assembly. These are designated 540, 541, and 542. Each cradle switch comprises a plunger, such as the plunger 543 that is associated with switch 540. The plunger 543 moves between an upper position indicated at 555 and a lower position as shown. When the microphones at the respective remote stations are positioned properly in their cradles, their associated cradle switches are depressed to their lowermost positions, which is the condition shown in FIGURE 5. In this case, each of the switch assemblies 540, 541, and 542 are in open condition. In order for any remote operator to initiate a service request action, the microphone at the station is removed from its cradle. This permits its associated plunger to move to its upper extremity which then enables the switch assembly associated with the plunger to close and initiate the selection and connection action.

A rewind function which is initiated by energization of magnet 418, FIGURE 4, is normally provided only for rapid and continuous reversing of the recording belt during transcription operations so that the transcriber may return to a desired spot on the belt for proof-reading purposes or other reasons. The rewind magnet 418 is energized through a contact 452 that is normally open, but which is closed under control of the clutch magnet 419 as indicated by the dashed line 453. It will be seen that a series circuit exists from contact 452, wire 6 in cable 405 to terminal 6 in junction box 406, wire 6 in cable 462, and contacts 437 and 438 to the foot control 404. The rewind magnet 418 is only subject to control of the rewind switch 447 and the play switch 448.

It is not necesasry that the remote stations A, B, and C be able to initiate a rewind function, so that various interconnected cable wires 6 and terminals 6 beyond the transcribe junction box 406 are available for use in circuit connections involved in the selection of stations A, B, and C.

*Initial conditions*

Certain initial conditions will be assumed. It will be assumed that the switch 408, FIGURE 4, is closed and that power is being supplied to the various circuits in the central apparatus 401. Closing of the switch 408 will also result in the application of power to the drive motor in the apparatus 401, not shown. This motor corresponds to motor 323 in FIGURE 3. It will also be assumed that a belt has been properly positioned on the rollers of the apparatus of 401 so that the No Belt contacts 425–427 are in an open condition. Also, the sound head at the central apparatus is assumed to be at its extreme left position so that the end of belt contacts 423, 424 are open. With power supplied, a power on lamp 454 is energized to indicate that the central apparatus is on.

At the transcribe station 402, the switch 443 is in its upper or "Dictate" position.

At each of the remote stations A, B, and C the respectively associated microphones 504, 505 and 506 are positioned in their cradles so that their related plungers are depressed, and the switches 540, 541, and 542 are in their normally open condition.

None of the select relays of any of the stations 402, A, B, or C is energized.

For purposes that will become apparent shortly, a terminal 12 is jumpered to the terminal 7 in junction box 510 by means of a wire 544 in order to establish selection circuit continuity. If another station were added to the system by cable 511, the jumper wire 544 at junction box 510 would be removed and would be applied instead between terminals 7 and 12 of the junction box associated with the new station.

*Service request by particular remote station, connection to central apparatus, and dictating operation*

It will now be assumed that an operator at one of the stations A, B, or C desires to dictate material for recording at the central apparatus 401, and for subsequent transcription. As an example, it will be assumed that the operator at station B desires to dictate, and removes the microphone 505 from its cradle at the station. Remote station B will be connected to the central apparatus 401 in the following manner. As soon as the microphone 505 at station B is removed from its cradle, the plunger 545 will move to its uppermost position as indicated by the dashed outline 546. This results in the contacts 562, 548–550 being closed.

With the previously assumed initial conditions, a selection circuit for energizing select relay 513 at station B now exists from terminal 413, FIGURE 4, wire 1 in cable 405, terminal 1 in junction box 406, wire 1 in cable 462, interlock contacts 431 and 432, wire 12 in cable 462, terminal 12 in junction box 406, line 12 in cable 455, terminal 6 in junction box 508, wire 6 in cable 547, interlock contacts 520 and 521 at stataion A, wire 12 in cable 547, terminal 12 in junction box 508, wire 12 in cable 507, terminal 6 in junction box 509, wire 6 in cable 582, interlock contacts 551 and 552 at station B, wire 12 in cable 582, terminal 12 in junction box 509, and wire 12 in cable 553 to terminal 6 in junction box 510.

From terminal 6 in junction box 510, the circuit continues through wire 6 in cable 554, interlock contacts 556 and 557 at station C, wire 12 in cable 554 to terminal 12 in junction box 510, and then by jumper 544 to terminal 7 in junction box 510.

The circuit then continues from terminal 7 in junction box 510, wire 7 in cable 553 to terminal 7 in junction box 509, wire 7 of cable 582 at station B, and contacts 562 and 548 which are now closed, line 559, diode 560, and line 561 to select relay 513, wire 5 in cable 582, terminal 5 in junction box 509, wire 5 in cables 507, 455, and 405 and terminals 5 in junction boxes 508 and 406 to terminal 414 in the central equipment 401. Relay 513 picks and transfers its associated contacts. The previously outlined pick circuit is then broken when interlock contacts 551 and 552 open. However, prior to these contacts opening, a hold circuit for relay 513 is completed from wire 6 of cable 582 through contacts 549 and 550 of the station B cradle switch, now closed, contacts 563 and 564, wire 565, and the same return circuit to terminal 414 in the central apparatus 401. The hold action occurs because the contacts 563 and 564 are designed to make before the contacts 551 and 552 break. The lamp 516 becomes energized to indicate that station B is now connected to the central apparatus 401. Energization of the relay 513 results in the connection of station B to the central station 401 through the various relay contacts of relay 513. The operator at remote station B can perform all normal operations with respect to the central apparatus 401 as if he were situated closely adjacent the apparatus 401.

For example, when the Record bar on microphone 505 is depressed, contacts 566, 567, and 568 are closed. A circuit then exists from wire 1 in cable 582, contacts 585 and 586, wire 1a in cable 582, contact 566 and contacts 567 and 568, wires 3, 4 and 4a of cable 582 and the other interconnecting cables to actuate the record relay 420 and the clutch magnet 419 in the apparatus 401. Activation of the back space magnet 417 and the clutch magnet 419 for review purposes can be effected by depression of the Listen-Review contacts 569 and 570 to their closed position. Punching of an index slip at the central apparatus 401 is controlled by the punch control 571 on the microphone 505.

If End of Belt is reached before dictation is completed, a circuit to operate the buzzer 535 in control box 502 at station B will be established as follows: Wire 1 in cable 582 through the normally closed buzzer contacts 572 and 573, buzzer 535, wire 574, contacts 587 and 588, now closed, wire 13 of cable 582, wire 13 of the other interconnected cables to terminals 456 and 457 in apparatus 401, and End of Belt contacts 423 and 424 to ground at terminal 414. The buzzer 422 at the central apparatus 401 will also be energized in parallel with the foregoing circuits.

At the completion of dictation the operator at the remote station B returns the microphone 505 to its cradle. This opens switch assembly 541, drops relay 513, and restores the system to its initial condition.

*Simultaneous service requests by more than one station, selection and connection of a particular one of the requesting stations*

It will be observed that the selection circuit comprises a first series connected path through the interlock contacts at each station, such as contacts 431, 432 at the transcribe station 402, contacts 520, 521 at station A, contacts 551, 552 at station B, and contacts 556, 557 at station C to terminal 12, wire 544, and terminal 7 in junction box 510. A parallel hold path for any previously picked select relay is tapped off of this series path from the individual wires 6 in the cables to each station and the associated hold contacts, such as contacts 549, 550 and 563, 564 at station B.

The selection circuit further comprises a parallel connected initial energizing or picking portion from terminals 7 in junction boxes 510, 509, 508, and 406 by wires 7 in the associated cables 554, 582, 547, and 462 and through the individual station switches and diodes to the respective select relays for picking the relays.

With the aforementioned arrangements, conflict among the various stations for access to the central equipment is eliminated. If two or more stations seek access to the central apparatus 401 at the same time, that station which is closest to the apparatus 401 will have priority, and will prevail over any station that is further away from the apparatus 401.

The selection sequence results in the parallel hold portion to all stations having a lower order of priority being broken when the interlock contacts at a preferred station open. Also, since the parallel initial energizing portion of the selection circuit follows the series interlocking portion, opening of the interlock contacts at a station having priority will remove operating potentials from all other stations in the system. The next result of these actions is that no other select relay can be picked since the parallel portion of the selection circuit is open, and that any select relays at stations further out on the circuit that were picked simultaneously with the picking of the select relay at the preferred station will not be able to hold since the interlocking and hold portion of the selection path is open at the preferred station.

It is aparent that the priority arrangements could be such that a more distant station, such as station C would have priority over a closer station, such as station B, rather than as described.

In order to illustrate the foregoing principles, it will now be assumed that the operators at each of the remote stations A and B simultaneously wish to gain access to the central apparatus 401. In this case, station A has priority or preference over station B.

If it is assumed that microphone 504 is removed from its cradle at the same instant as microphone 505, a pick circuit for select relay 512 at station A will exist as follows. Terminal 12 of junction box 406, line 12 of cable 455, terminal 6 of junction box 508, wire 6 of cable 547, interlock contacts 520 and 521, wire 12 in cable 547 to terminal 12 of junction box 508 and through the selection pick circuits from station to station previously described, wire 7 of cable 547, contacts 589 and 577 of cradle switch assembly 540, and diode 590 to select relay 512 at station A. Relay 513 at station B also picks as previously described, because, as mentioned, a parallel pick circuit exists for each station from the wire 7 in the respectively associated junction boxes 406, 508, 509, and 510 as a result of the jumper 544 having been connected from terminal 12 to terminal 7 in junction box 510. With microphones 504 and 505 off their respective cradles, the upper and lower contacts of their cradle switches will be closed and pick potential will be present for a short interval of time from wire 7 in cable 547 at station A as well as wire 7 in cable 582 at station B to cause both select relays 512 and 513 to pick. The hold contacts of the select relays in the station control boxes, such as contacts 518 and 519 in control box 501, are so formed that they make contact before the related interlock contacts, such as contacts 520 and 521, open. For a brief instant, therefore, a hold potential will be present for select relay 512 from wire 6 in cable 547, the lower contacts 578 and 579 of the cradle switch 540, and contacts 518 and 519 to relay 512, and it is also possible that a hold potential will exist for select relay 513 from wire 6 of cable 582 through the lower contacts 549 and 550 of the cradle switch 541, and contacts 563 and 564 to relay 513. This may occur in the brief moment before any of the interlock contacts have been opened.

As soon as the interlock contacts 520 and 521 associated with select relay 512 at station A have opened, however, it will be noted that the path comprising wire 12 in cable 547, wire 12 in cable 507, and wire 6 in cable 582 through the contacts 549 and 550 and contacts 563 and 564 at station B will be open, and no further potential will be present to hold the select relay 513 at station B. Select relay 513 will immediately drop out, and select relay 512 will continue to hold. Station A will thereby have gained access to the central apparatus in preference to station B.

Because of the aforementioned unique interlocking arrangements, it is not possible for any two stations to gain access to the central apparatus 401 at the same time.

*Transcription operation*

It will be recalled that the switch 443 at the transcribe station 402 is normally in an upper Dictate position. If none of the stations A, B, or C is making use of the central recording facilities at station 401, the operator at the transcribe station 402 can initiate a transcribe operation by moving the switch 443 to its center or Transcribe position. If the central facilities are not in use, this will result in the immediate energization of the select relay 428, and the transcribe station is thereby connected to the apparatus 401.

If, however, the central apparatus 401 is in use by one of the remote dictation stations, the operator at the transcribe station 402 will normally move the switch 443 to its Signal position. This conditions the system so that relay 428 at the transcribe station will be picked as soon as dictation has been completed at the station that is currently active. It will also activate the buzzer at the central station to notify the transcriber that the system is now available. The select relay 428 at the transcribe station 402 is normally picked from terminal 7 at junction box 406, wire 7 in cable 462, and switch subassembly 445. However, if the system is in use, and another station has obtained access to the central apparatus 401 this pick circuit will have been broken prior to the operator at the transcribe station moving the switch 443 to its Transcribe or Signal position. As soon as the dictation operation has been completed at one of the stations A, B, or C, the related select relay at that station drops out, and the selection circuit from the various terminals 7 and junction boxes 406, 508, 509, and 510 will again be effective. Assuming that the switch 443 has been moved to the Transcribe position, the potential on the wire 7 in cable 462 from terminal 7 in junction box 406, switch subassembly 445, line 458, and diode 459 will result in select relay 428 picking. In the illustrative embodiment, the transcribe station 402 has priority over other stations in the system when simultaneous access to the central equipment is sought. As soon as the select relay 428 has been energized, a hold circuit is established from terminal 1 of junction box 406, wire 1 of cable 462, the switch subassembly 446, and the contacts 429 and 430 to relay 428. As the relay 428 moves to a fully energized condition, the interlock contacts 431 and 432 are broken and the selection circuits for the other stations in the system are thereby broken.

The energization sequence of relay 428 just mentioned holds true for an immediate selection or for a delayed selection of the transcribe station following the setting of the switch 443 to its Transcribe or Signal position. However, in the Signal position, buzzer 422 is energized to give the transcriber an audible indication that the system has become available. This is performed in the following manner. A circuit exists from terminal 414, wire 5 of cable 405, terminal 5 of junction box 406, wire 5 in cable 462, contact 466, switch subassembly 444, line 460 from subassembly 444 to contacts 441 and 442 of the select relay 428, wire 13 of cable 462 to terminal 13 in junction box 406 and wire 13 of cable 405 to buzzer 422. The transcribe operator opens the circuit to the buzzer 422 by moving the switch 443 to the center or Transcribe position. The transcribe operator will then proceed with the transcription operation, after inserting a belt in proper position. As soon as the switch 443 is moved to the Transcribe position, a potential signalling circuit exists in parallel to any of the remote stations in order to enable them to notify the transcriber that they desire to dictate.

If the transcribe station is currently connected to the central apparatus 401, it is not possible for any of the remote stations to become connected or gain access to the apparatus 401 until the transcribe operator has finished transcribing. In order to be able to check the status of the central apparatus, and to indicate that it is desired to dictate, each of the remote stations A, B, and C is supplied wih a respectively associated switch 537, 538, and 539. Ground potential exists from terminal 414 to wire 5 in all of the cables and to all of the stations in parallel. The dictator at station A, for example, can indicate a desire to dictate by depressing the attendant switch 537 at station A. This completes a circuit through the upper contacts of switch 537 to actuate station A buzzer 534 from the supply voltage on wire 1 of cable 547. In addition, a circuit is completed through the lower contacts of the signal switch 537 over wire 14 in cable 547, terminal 14 of junction box 508, wire 14 of cable 455, terminal 14 of junction box 406, wire 14 in cable 462, center contact 467 of the switch subassembly 444, and line 460, through contacts 441 and 442 to line 13 and over to the central apparatus 401 to energize buzzer 422.

Station A will be permitted to gain access to the central apparatus 401 when the transcribe operator moves the switch 443 to the upper Dictate position at the end of the transcription operation.

It is not essential that the transcribe station be included in the system. It might be preferable under some circumstances to confine the system to the central apparatus 401 and dictating stations A and B only, or A, B, and C only.

If a system with central station 401 and stations A and B alone is desired, the jumper 544 would be connected between terminals 7 and 12 in junction box 509 as indicated by the dashed line 580, rather than as shown. The wires in cable 462 of transcribe station 402 would be disconnected at the various terminals in junction box 406. A jumper 465 can be connected between terminals 13 and 14 in junction box 406 to enable attendant signalling from remote stations. A jumper 581 would be added at junction box 508 between terminals 1 and 6 to establish continuity for the selection circuit.

If a system with central station 401 and stations A, B, and C, and no transcribe station is desired, wiring changes similar to those just mentioned would be made with the exception that jumper 544 would remain at junction box 510.

A novel dictating and transcribing system has been provided which operates in a reliable and efficient manner, and in which selection and connection difficulties previously encountered in prior art systems have been greatly minimized.

While the invention has been particularly shown and described with reference to a preferred embodiment thereof, it will be understood by those skilled in the art that various changes in form and detail may be made without departing from the spirit and scope of the invention.

What is claimed is:

1. A station selection system comprising:
a plurality of diversely located control stations;
a controlled station accessible to any of said control stations;
a source of potential;
interlock means at each of said control stations;
selection means at each of said control stations for connecting each individual control station to said controlled station and for controlling the interlock means at each station;
a first circuit connected to said source of potential and routed in sequence through each of the interlock means at said control stations in a serial path from one control station to another and according to a predetermined order of priority;
an initial energizing second circuit connected to the termination of said interlocking first circuit and routed in parallel to all of said control stations for supplying an initial energizing potential to the selection means at said control stations, said second circuit being normally open at each of said control stations;
an individual holding third circuit at each control station, each said holding circuit being connected in parallel to said first circuit just prior to the interlock means at the respective control station for supplying potential to hold the selection means energized at each said control station, each said holding circuit being normally open;
means at each control station for closing said energizing second circuit connection to thereby energize the selection means at each said control station;
and means under control of an energized selection means for closing the parallel hold circuit at the associated control station to maintain said selection means at said associated control station energized and to thereafter operate the interlock means in said serial interlocking path to thereby render ineffective the energizing second circuit connections to all stations and to further render ineffective the holding circuits of all other control stations having a lower order of priority.

2. A station selection system comprising:
a plurality of diversely located dictating stations each having associated service request switching means;
a recording station accessible to any of said dictating stations;
a source of potential;
interlock means at each of said dictating stations;
selection means at each of said dictating stations for connecting each said station to said recording station and for controlling said interlock means;
a first circuit connected to said source of potential and routed in sequence through each of the interlock means at said dictating stations in a serial path from one dictating station to another and according to a predetermined order of priority;
an initial energizing second circuit connected to the termination of said interlocking circuit and routed in parallel to all of said dictating stations for supplying an initial energizing potential to the selection means at said dictating stations, said second circuit being normally open at each of said dictating stations;
an individual holding third circuit at each dictating station, each of said holding circuits being connected in parallel to said first circuit just prior to the interlock means at the respective dictating station for supplying potential to hold the selection means energized at each said dictating station, each said holding circuit being normally open;
means at each dictating station responsive to closure of the respective service request switching means for closing said energizing second circuit connection to thereby energize the selection means at said dictating station;
and means under control of an energized selection means for closing the parallel hold circuit at said dictating station to maintain said selection means at said dictating station energized and to thereafter operate the interlock means in said serial interlocking path to thereby render ineffective the energizing second circuit connections to all dictating stations and to further render ineffective the holding circuits of all other dictating stations having a lower order of priority.

3. A station selection system comprising:
a central station;
a plurality of remote stations;
connecting circuit means routed from said central station to each of said remote stations in succession;
individual selection circuits at each remote station for coupling each remote station to said connecting means, each of said circuits including an energizing portion and a holding portion;
a normally closed interlocking element at each said remote station;
a source of potential;
a series circuit connected to said source of potential, said series circuit being routed from one remote station to another according to a predetermined order of priority, and connected in sequence to the holding circuit portions and the said interlocking elements at each said remote station;
an initial energizing circuit connected to said series circuit and routed in parallel normally open branches to the individual selection circuits of each remote station;

means for closing the branch circuit at any remote station in order to energize the associated selection circuit;

and means responsive to the energization of the selection circuit at any one remote station for closing the holding circuit portion at said one remote station to maintain the selection circuit at said one remote station energized and to thereafter open the interlocking element at said one remote station to thereby render ineffective the energizing circuit connections to all remote stations and to further render ineffective the hold circuit portions of all other remote stations having a lower order of priority.

4. A station selection system comprising:

a recording station;

a plurality of dictating stations, each said dictating station including control and signalling elements;

normally inactive interconnecting circuit means routed from said recording station to each of said dictating stations to provide signalling and control paths between said recording station and any dictating station that becomes connected thereto;

a source of potential;

interlock contacts at each of said dictating stations;

selection means at each of said dictating stations for connecting each said dictating station to said recording station over said interconnecting circuit means and for controlling said interlock contacts;

a series arranged first circuit connected to said source of potential and routed in sequence through each of the interlock contacts at said dictating stations in a serial path from one dictating station to another and according to a predetermined order of priority;

an initial energizing second circuit connected to the termination of said interlocking circuit and rotued in parallel to all of said dictating stations for supplying an initial energizing potential to the selection means at said dictating stations, said second circuit being normally open at each of said dictating stations;

an individual holding third circuit at each dictating station, each of said holding circuits being connected in parallel to said first circuit just prior to the interlock contacts at the respective dictating station for supplying potential to hold the selection means energized at each said dictating station, each said holding circuit being normally open;

means at each dictating station for closing said energizing second circuit connection to thereby energize the selection means at said dictating station;

and means under control of an energized selection means at any one dictating station for establishing connection of said control and signalling elements at said one station to said recording station over said interconnecting circuit means, for closing the parallel hold circuit at said one dictating station to maintain said selection means at said one dictating station energized and to thereafter operate the interlock contacts at said one dictating station to thereby render ineffective the energizing second circuit connections to all dictating stations and to further render ineffective the holding circuits of all other dictating stations having a lower order of priority.

5. A station selection system comprising:

a recording station;

a plurality of diversely located dictating stations arranged in a predetermined successive order;

connecting circuit means routed from said recording station to said dictating stations in succession;

selection circuits for selectively coupling each of said dictating stations to said recording station through said connecting circuit means, each of said selection circuits having an initial energizing circuit section, and a holding circuit section;

interlocking means at each of said dictating stations;

a source of potential;

a series-parallel interlocking circuit arrangement connected to said potential, said interlocking circuit having a first series holding portion connected in sequence through the interlocking means of said dictating stations and a second portion having normally open branches connected respectively in parallel to each of said initial energizing circuit sections;

switching means at each of said stations for closing the respective branch circuit to thereby apply said potential to the related initial energizing circuit section for activating the selection circuit of said station;

and means responsive to the activation of the selection circuit at any station for closing the holding circuit at said station and for subsequently opening the first portion of said interlocking circuit to open the initial energizing branches of all stations and also to open the holding circuits of all stations arranged subsequent to a said activated station.

6. A station selection system comprising:

a recording station;

a plurality of diversely located dictating stations arranged in a predetermined successive order;

connecting circuit means routed from said recording station to said dictating stations in succession;

selection circuits for selectively coupling each of said dictating stations to said recording station through said connecting circuit means, each of said selection circuits having a relay, an energizing circuit section, and a holding circuit section;

interlocking means at each of said dictating stations;

a source of potential;

a series-parallel interlocking circuit arrangement connected to said potential, said interlocking circuit having a first series portion connected in sequence through the interlocking means of said dictating stations and a second portion having normally open branches connected respectively in parallel to each of said initial energizing sections;

means at each of said dictating stations for closing the respective branch circuit to thereby apply said potential to the related circuit section for activating the selection relay of each said station;

and switching contacts operated under control of a selected relay for closing the holding circuit at the associated station and for subsequently breaking the first series connected portion of said interlocking circuit to thereby open the initial energizing branches of all stations and to also open the holding circuits of all stations arranged subsequent to said associated station.

7. A multiple station system comprising:

a plurality of remote stations;

a central station;

multi-path circuit means interconnecting said stations, said means including selection wires and control wires;

a series-parallel interlocking and selection circuit comprising a first normally closed series selection portion for holding selection and a second normally open parallel selection portion for initiating selection, said circuits being connectively established through said selection wires and routed from one station to another according to a predetermined order of priority;

means for initiating a selection at each of said stations through said series-parallel selection initiation circuit;

and interlocking means at each station responsive to a selection initiation for holding a preferred station selected, for subsequently locking out any concurrently actuated station having a lower order of priority, and for locking out selection initiation of all other stations in the system from said parallel selection initiating circuit portion.

8. A multiple station system comprising:
- a central station;
- a plurality of remote stations, each of said stations having elements for controlling functions at said central station when connected thereto;
- multi-path circuit means interconnecting said stations, said means including selection wires and control wires;
- a series-parallel interlocking and selection circuit comprising a first normally closed series selection portion for holding selection and a second normally open parallel selection portion for initiating selection, said circuits being connectively established through said selection wires and routed from one station to another according to a predetermined order of priority;
- means for initiating a selection at each of said stations through said series-parallel selection initiating circuit;

- interlocking means at each station responsive to a selection initiation for holding a preferred station selected, for subsequently locking out any concurrently actuated station having a lower order of priority, and for locking out selection initiation of all other stations in the system from said parallel selection initiating circuit;
- and means at said preferred station for connecting control elements at said preferred station to said central station through the control wires in said multi-path connecting circuit means.

References Cited by the Examiner

UNITED STATES PATENTS

| | | | |
|---|---|---|---|
| 2,738,376 | 3/1956 | Vernam | 178—4.1 |
| 2,857,475 | 10/1958 | Taylor | 179—100.1 |

IRVING L. SRAGOW, *Primary Examiner.*